(12) United States Patent
Meier et al.

(10) Patent No.: US 9,222,002 B2
(45) Date of Patent: Dec. 29, 2015

(54) METHOD FOR PRODUCING AN ADHESIVE TAPE

(75) Inventors: Thorsten Meier, Duesseldorf (DE); Peter Rambusch, Wuppertal (DE); Kay Ruhnau, Wuppertal (DE)

(73) Assignee: certoplast VORWERK & SOHN GMBH, Wuppertal (DE)

( * ) Notice: Subject to any disclaimer, the term of this patent is extended or adjusted under 35 U.S.C. 154(b) by 0 days.

(21) Appl. No.: 14/233,790

(22) PCT Filed: Aug. 17, 2012

(86) PCT No.: PCT/EP2012/066078
§ 371 (c)(1),
(2), (4) Date: Feb. 4, 2014

(87) PCT Pub. No.: WO2013/024150
PCT Pub. Date: Feb. 21, 2013

(65) Prior Publication Data
US 2014/0141159 A1 May 22, 2014

(30) Foreign Application Priority Data
Aug. 18, 2011 (DE) .......................... 10 2011 052 821

(51) Int. Cl.
*B05D 5/10* (2006.01)
*C09J 7/02* (2006.01)

(52) U.S. Cl.
CPC ................ *C09J 7/02* (2013.01); *C09J 2201/28* (2013.01); *C09J 2421/00* (2013.01)

(58) Field of Classification Search
CPC ................................. C09J 7/02; C09J 2201/28
USPC ............................................. 427/207.1, 208.6
See application file for complete search history.

(56) References Cited

U.S. PATENT DOCUMENTS

| | | | |
|---|---|---|---|
| 5,776,285 A * | 7/1998 | Blumle | 156/256 |
| 6,187,432 B1 * | 2/2001 | Krish et al. | 428/343 |
| 2002/0151865 A1 * | 10/2002 | McLaughlin et al. | 604/389 |
| 2004/0175493 A1 | 9/2004 | Monschein | |
| 2005/0175806 A1 * | 8/2005 | Banovetz | 428/40.1 |
| 2013/0273333 A1 | 10/2013 | Meier | |

FOREIGN PATENT DOCUMENTS

EP 1431360 A 6/2004

* cited by examiner

*Primary Examiner* — Xiao Zhao
(74) *Attorney, Agent, or Firm* — Andrew Wilford (57) ABSTRACT

The present invention relates to a method for producing an adhesive tape (2). The adhesive tape (2) possesses a tapelike carrier (3) and at least one strip (4; 4a, 4b) of adhesive which is applied to the carrier (3) on at least one side. Here, first of all, a carrier web (1), coming from a supply unit (7), is supplied to at least one coating unit (9, 10). The coating unit (9, 10) then generates the at least one strip (4; 4a, 4b) of adhesive on the carrier web (1) in its longitudinal extent, by carrying out coating with an adhesive. Lastly, the carrier web (1) is slit in the longitudinal direction into the individual adhesive tapes (2); the two last-mentioned method steps may also be run in the opposite order.

11 Claims, 4 Drawing Sheets

METHOD FOR PRODUCING AN ADHESIVE TAPE

CROSS REFERENCE TO RELATED APPLICATIONS

This application is the US-national stage of PCT application PCT/EP2012/066078 filed 17 Aug. 2012 and claiming the priority of German patent application 102011052821.0 itself filed 18 Aug. 2011.

FIELD OF THE INVENTION

The present invention relates to a method of making adhesive tape with a strip substrate and with at least one band of adhesive applied on at least one face of the substrate.

A method of this kind has been described, for example, in DE 103 09 447 [US 2004/0175493]. Adhesive tapes are usually made by applying a contiguous coating to one or both faces of the strip substrate and/or a substrate web. Subsequently, the substrate material and/or substrate web coated in this manner is wound onto a so-called master roll from which individual adhesive-tape rolls, with adhesive tape wound thereupon, are cut off or out (transversely).

The prior art according to DE 103 09 447 provides that the substrate material and/or the substrate web is guided past an immersion roller that is in contact with the substrate web. The immersion roller rotates in a bath of adhesive. This way, the adhesive is transferred to the surface of the roller. Individual strips of adhesive tape can be defined in this manner. It is understood that this method is naturally also suited for providing full area coverage of adhesive on the substrate web.

The prior art according to utility model DE 20 2010 014 239 [US 2013/0273333] by the applicant further discloses an adhesive tape where the adhesive strip covers between about 20% and 50% of the area of the respective substrate face. This way, it is possible to use the adhesive tape especially advantageously as a roll tape for forming a tubular jacket. In fact, this tubular jacket is substantially made of a tape ribbon with an adhesive strip; it is guided around the one or multiple cable(s) or, generally around the material that is to receive the winding, in a spiral and with the adhesive tape being glued thereupon and onto itself by the adhesive strips. Working with two adhesive strips is particularly advantageous, specifically with one adhesive strip on the upper face of the substrate and one adhesive strip on the lower face of the substrate. Basically, this has proven itself effective.

However, the practical methods that have been used to date for making such adhesive tapes are problematic. For example, using the immersion rollers according to DE 103 09 447, it is not possible to produce an adhesive strip of uniform shape and dimensions, because the immersion and transfer process is imprecise. Moreover, the complexities of the applied production systems are quite considerable. Moreover, the individual adhesive strips in the known method according to specification DE 103 09 4471 can "bleed" longitudinally along the substrate web; meaning, the adhesive strips may not be able to maintain their longitudinal position. This is disadvantageous, especially if the substrate web is subsequently wound up into a master roll, as previously described, from which the respective rolls of adhesive tape are then cut off or cut out.

Potential imprecisions in the positioning of the adhesive tape on the respective substrate face can possibly result in the fact that the tubular jacket, which must be made using such an adhesive tape according to the teaching as specified in utility model DE 20 2010 014 239, cannot be obtained at all or only with flaws. In addition, there exists the risk that an inexactly positioned adhesive strip, when it is part of the tubular jacket to be made, makes contact with the cables that must be jacketed, which is a circumstance that must actually be avoided. Similarly, inaccurate positioning of the adhesive tape can lead to tackiness of the outside of the finished tube.

OBJECT OF THE INVENTION

It is therefore the object of the present invention to provide a remedy for these problems.

SUMMARY OF THE INVENTION

The underlying technical problem of the present invention is the object of seeking to improve such a method of making adhesive tape in such a manner that the technical complexity of the manufacturing system is reduced and at least one adhesive strip is applied to the strip substrate in a stable position. In particular, it is the object of the present invention to minimize any "bleeding" of the adhesive, as described above, and/or avoid that from occurring completely. An apparatus that is particularly suited for carrying out the method shall be described as well.

To achieve this technical object, according to the invention an adhesive tape is made with a strip substrate and at least one adhesive strip that is applied at least on one face of the substrate according to the following method steps:
  feeding a substrate web from a supply to at least one coating device;
  the coating device applying an adhesive coating to the substrate web to form thereon at least one longitudinally extending adhesive strip;
  cutting the substrate web longitudinally into individual adhesive tapes (2).

In principle, the order of these last two above-given method steps can be reversed. The following method steps are used in that case:
  feeding a substrate web from a supply to at least one coating device;
  cutting the substrate web longitudinally into individual adhesive tapes.
  the coating device applying an adhesive coating to the substrate web to form thereon at least one longitudinally extending adhesive strip;

Using the described method, it is possible to coat an adhesive tape with the desired adhesive strip that continuously maintains the position thereof longitudinally with accurate dimensions and orientation relative to the strip substrate. This way, it is possible to use the present method particularly advantageously for making adhesive tape, as described in the introduction based on the previously mentioned utility model DE 20 2010 014 239. With such an adhesive tape, it is consequently possible to easily create the tubular jacket, as also referred to by the art in the specification.

As a matter of principle, the used adhesive and/or adhesive agent can be any kind of adhesive and/or adhesive agent that is applied and/or can be applied, typically in a contactless manner, to the substrate web. It is understood that the adhesive and/or adhesive agent can also be applied with contact, which is also within the scope of the invention. In advantageous embodiments, however, the coating device operates in a contactlessly, which means it does not mechanical contact the substrate web that is to be coated. Suitable adhesives therein are, for example, dispersion adhesives, hot-melt adhesives, spray adhesives, etc. This means, as matter of principle, the coating device can be designed as a spray nozzle, application nozzle or pour-on device (for example, as part of a curtain coating system).

Moreover, the substrate web that is to be coated is generally substantially or almost vertical at the coating device. It is understood that a horizontal and slanted orientation of the substrate web at the coating device also falls within the scope of the invention. The substantially vertical or almost vertical orientation of the substrate web at the coating device ensures in this context that the adhesive strip or more adhesive strips that is/are created with the aid of the coating device do not "bleed" on the substrate web, seen longitudinally of the substrate web.

This means that at least one adhesive strip created on the substrate web with the aid of the coating device typically remains stable in the intended position thereof, seen relative to the substrate web. Consequently, edges of the adhesive strip are evenly or almost evenly spaced relative to the edges of the substrate web. This holds true for the eventuality that the substrate web is coated with the adhesive providing full area coverage, meaning that the adhesive strip covers the whole surface of the substrate web, as well as for the eventuality that a plurality of adhesive strips spaced relative to each other are created extending longitudinally of the substrate web with the aid of the coating device. In fact, the cardinal aspect regarding the method, as presently described, is to ensure that the substrate web travels in a direction perpendicular to the coating device that extends transversely. This can be easily achieved by guide rollers or other suitable guide means.

Various options are conceivable as treatment modalities of the coated substrate web. For example, the substrate web that is coated with the adhesive can be wound up, in particular, providing a precise alignment of the edge. The finished roll is then cut up; meaning, different rolls with the desired adhesive strips are cut off transversely relative to the longitudinal direction.

As an alternate solution, it is also possible to cut the coated substrate web with exactly aligned edges. This means that the cut edge is only formed at the time of the actual cutting process of the substrate web. This way, it is possible to work with excess and/or waste, or not. In the first mentioned scenario, the adhesive strip is intentionally made somewhat wider than what is needed for the finished adhesive tape. This way, it is possible to compensate for any imprecisions that may have occurred during application of the adhesive strip.

As a second alternate option, the coated substrate web can be cut at the adhesive strip, particularly without excess and/or waste. For example, it is possible to cut the coated substrate web along the centerline of the adhesive strip. This way, it is possible to produce adhesive tapes, and consequently rolls with the adhesive tapes, that can be wound up in opposite directions. As a matter of principle, in this context, it is also possible, for example, to form an adhesive tape on a (single) continuous substrate web that covers the complete surface of the web next to partially coated adhesive tapes.

In this context, the invention proposes that the upper face and/or lower face of the substrate web be coated with different adhesive strips. For example, the substrate web can be coated in one area with complete surface coverage. Furthermore, at least one further, second area can be partially coated and/or be provided with a coating that has only partial surface coverage. The individual longitudinally extending regions of the substrate web can correspond to different adhesive tapes. To utilize the same ones, the substrate web is typically cut transversely.

This means the actual separation into the individual, desired adhesive tapes is achieved at this time with the aid of a cutting process that is precisely aligned in terms of the edges. Such a cut can be longitudinally and/or transversely of the substrate web. A cutting apparatus therein can be exactly aligned with the substrate web, for example, by measuring a distance to the edge of the substrate web using a laser. A distance measurement of this kind can also be done by the coating device. In this case, the coating device is configured at least as axially adjustable, whereby, as a matter of principle, it is possible to create wave-like adhesive strips on the substrate web well. A transverse adjustment of the coating device, meaning transversely relative to the longitudinal extension of the substrate web, is possible as well and comprised in the scope of the present invention.

In general, the coating device and the substrate web can be moved relative to each other. This way, the user will guide the substrate web essentially vertically or almost vertically, at least in the region of the coating device. The coating device can be adjusted horizontally or for the most part horizontally, and/or in the axial direction relative to it. As a matter of principle, naturally, it is also possible to move the substrate web and the coating device in the same direction. In general, however, the coating device is stationary relative to the substrate web that is moved vertically therepast, and it can be adjusted axially and/or horizontally, if at all, relative to the vertically moving substrate web.

Typically, at least one coating device ensures that any and all strips of adhesive are formed on the substrate web in a single run. As explained previously, the adhesive strips can make be contiguously applied over the complete area, or can be a single adhesive strip or a plurality of adhesive strips for a partially coated adhesive tape, that are defined jointly on a continuous substrate web and that are not cut up into the desired adhesive tapes until a later time. In this case, the adhesive applicator is adjusted to the width of the substrate web and has a corresponding transverse dimension. If a nozzle is provided at this point to function as a coating device for applying, for example, a hot-melt adhesive, it is sufficient for a template upstream of the nozzle and has the required transverse dimension, to be adjusted to the width of the substrate web. It is understood that, by way of an alternate solution or in addition, it is also possible to work with a template that is downstream of the nozzle.

In fact, the template in question, which is provided at the outlet, generally ensures that individually spaced adhesive strips can be created. The template actually determines the width and/or position of the adhesive strip it forms on the substrate web. It is understood that, naturally, the template can be exchanged for different arrangements, widths, etc. of the adhesive strip. In addition, with the aid of the coating device and/or the nozzle, it is possible to vary the surface application of the adhesive (mass per unit surface area) at the adhesive strip within certain limits. Such a variation of the surface application is also possible and conceivable for modifying the performance output of a pump that is obligatory in this case for providing the adhesive.

As a matter of principle, the coating device can also be configured such that a (small) weight-related fraction of the adhesive and/or the adhesive agent is pressed into the substrate web. In this case, the adhesive in fact not only provides the desired adhesive strip but reinforces the substrate web as well. Typically, in the context of providing stabilization by means of the incorporated adhesive, such stabilization is provided at least at the single cut edge, which will be defined below, of the plurality of cut edges. The purpose of proceeding as indicated above is the goal of wanting to provide a flawless cut edge in an effort to avoid the circumstance that, for example, fibers escape from the material of the substrate web due to the cutting process.

It is understood that, naturally, the stabilization of the substrate web as described above with the aid of the adhesive and/or adhesive agent is only one possible and conceivable variant. It is understood that, in fact, such stabilization can also be achieved independently of the adhesive and/or adhesive agent. For example, working with a nonstick coating is possible, such as, for example, an acrylate or another polymer, in order to achieve the described stabilization of the substrate web. Typically, this occurs prior to the application of the adhesive and/or adhesive agent.

As indicated above, the used adhesive and/or adhesive agent can be a spray adhesive, a hot-melt adhesive, or the like. A dispersion adhesive is possible as well and falls within the scope of the present invention. It is essential that the adhesive be applied in a contactless manner with the aid of a coating device; for example, without any mechanical applicator or comparable device. It is understood that the application of the adhesive with contact is also comprised within the scope of the present invention. If a hot-melt adhesive is used, advantageously, this is a hot-melt adhesive derived from natural rubber. The hot-melt adhesive is liquefied by heating a granular form thereof; it can then be pressed through the previously mentioned template that is provided at the outlet of the nozzle. This way, the hot-melt adhesive is applied to the substrate web. As an alternative to granules, the hot-melt adhesive can also be melted from a block.

Following application, it is possible to cross-link the adhesive, if necessary. In this context, irradiation with electron radiation, UV rays or also x-rays has proven effective and is therefore comprised within the scope of the present invention. It is understood that, aside from such physical cross-linking methods, chemical cross-linking processes are naturally conceivable as well and thus also fall within the scope of the present invention. In general, a cross-linker is in most cases in the travel direction of the substrate web downstream of the coating device. This configuration is chosen that the respective adhesive strip is cross-linked immediately after the application step, and no (further) mechanical contact occurs, for example with a roller, such as a guide roller, winder, etc.

In most cases, at least two coating devices and/or two nozzles are provided. The two coating devices are able coat the substrate on one substrate face, defining one or more spaced adhesive strips on the substrate web. Typically, however, the coating devices are opposite each other with regard to the substrate web and relative to the substrate that is, in contrast thereto, in the center. In fact, the one coating device ensures that the top substrate face is provided with one or more adhesive strips. In contrast, the further, second coating device ensures that the bottom substrate face is provided with one or more the desired adhesive strips. This means that these two coating devices can be easily used for carrying out coatings of strip substrates, as described in detail in the previously referenced utility model DE 20 2010 014 239.

Typically, as explained previously, the substrate web is guided substantially vertically or almost vertically at the one and/or both coating devices. In connection with a guide roller, which is provided opposite of the respective coating device, the invention ensures that the adhesive layer and/or the adhesive strip, as it is created with the aid of the respective coating device, does not "bleed" longitudinally of the substrate web. This means that the thus created adhesive strip maintains a distance, or is spaced, relative to the edges of the substrate web, the spacing being adjusted ahead of time. This way, it is possible to cut the substrate web with particular ease and exactness of the edges after application of the adhesive.

As described above, the adhesive strip covers the respective substrate face only partially. In most cases, the adhesive strip covers between 5% and 50% of the surface area of the respective substrate face. It is understood, naturally, that this applies only by way of an example. Moreover, in most cases, the adhesive strip extends longitudinally and at the edge of the substrate. Moreover, the two adhesive strips are on the upper face and on the lower face of the substrate in such a way that they stop at substrate edges opposite each other. Moreover, the adhesive strips are in most cases configured such that, substantially, it is possible to maintain a corresponding width. As a matter of principle, adhesive strips with different widths are naturally also comprised in the scope of the present invention.

For example, one adhesive strip can be configured as wider than the other adhesive strip. This helps save adhesive during the coating step. In addition, it is possible for the wide adhesive strip to provide adhesive strength not only by adhesion thereof on the back of the substrate but also by adhesive-on-adhesive action, in consideration of the narrow adhesive strip, when a tubular jacket is created by the spiral-like adhesive action of the adhesive tape. This provides added security for a substrate with single-side coating.

A cutting device is provided to be able to divide the substrate web into the individual adhesive strips. This can be achieved, for example and without limitation, by a blade beam with rotating knives. As a matter of principle, a blade cut with or without a counter-roller is possible, as well as a shear cut. In addition, the invention also comprises laser cuts and thermal cuts. The cutting device generally extends transversely to the longitudinally extending substrate web and ensures that the substrate web is easily divided transversely into the individual adhesive strips. Alternately or additionally, it is possible to subdivide the substrate web also transversely into the individual adhesive strips. When a blade bar is present, the spacing between individual rotating blades determines the width of the resulting adhesive strips.

The substrate and/or the substrate web can be laminated on one face or both, if necessary. This lamination is typically completed prior to the adhesive being applied. In this context, it is recommended to provide a cutting area and/or a region that is defined later by a single or more cut edge and/or edges with, for example, a nonstick coating. This can be, for example, an acrylate coating for the purpose of solidifying a woven or non-woven fabric that is used as a material for the substrate web, in the region of the cut. The coating therein is defined, as described previously, prior to applying the adhesive strip to the substrate web. This serves to improve the quality of the cut.

A laminate of this kind moreover offers the possibility of defining the adhesive and/or adhesive strip only at the cut and/or at the cut edges. This helps save adhesive, and it is possible to obtain a higher level of flexibility of the adhesive strip that is only laminated on the edge. Moreover, by providing such full lamination area coverage of the substrate web prior to the application of the adhesive at one or more the cut edges, it is possible to achieve a higher level of thickness for the adhesive edge that is thus made.

This results in increased sound-proofing and smaller density, as well as a lower weight in comparison to the adhesive tapes of similar strength of the substrate web. Moreover, disintegration signs of the adhesive due to heat are not seen at all, or not as much, in contrast to coatings that use the adhesive on a greater scale. All this can be achieved, for example, by coating the substrate web on one substrate face or on both substrate faces twice; in particular, first with the laminate and/or the nonstick coating and subsequently with the adhesive. Typically, the laminate is applied over the full surface, wherein, in contrast, the adhesive only coats partial areas.

In this case, two coating devices are typically embodied; namely, one coating device for the laminating action and one further for applying the adhesive. Both coating devices produce along the longitudinal extension of the substrate web, on the one hand, the lamination strip and, on the other hand, the adhesive strip.

As a matter of principle, the position of the coating device can be freely chosen when compared to the substrate web. The coating device is typically aligned transversely relative to the substrate web. As a matter of principle, naturally, it is also possible to align the coating device in the direction of the substrate web or at an angle, which is also comprised by the scope of the invention.

Regarding the creation of the plurality of adhesive strips, it is possible to use a matching adhesive for the coating operation. However, it is also conceivable to work with different adhesives, for example a hot-melt adhesive and a dispersion adhesive. So-called reactive adhesives are comprised within the scope of the present invention as well, which consist of two nonstick components that react with each other, when they come into contact with each other. With such two nonstick components, a third adhesive strip may be necessary to exercise a rolling force with the finished adhesive-tape roll.

A further possible variation is the option of modifying the area of application of the adhesive when carrying out the respective adhesive strip. This way, it is possible to get different adhesive forces among different adhesive strips, from one to the next. It is also the subject-matter of the present invention to provide an apparatus for making an adhesive edge that is particularly well suited for carrying out the described method.

BRIEF DESCRIPTION OF THE DRAWING

The invention will be illustrated in further detail below with reference to drawings show a single embodiment. Therein.

SPECIFIC DESCRIPTION OF THE INVENTION

Figure 1:
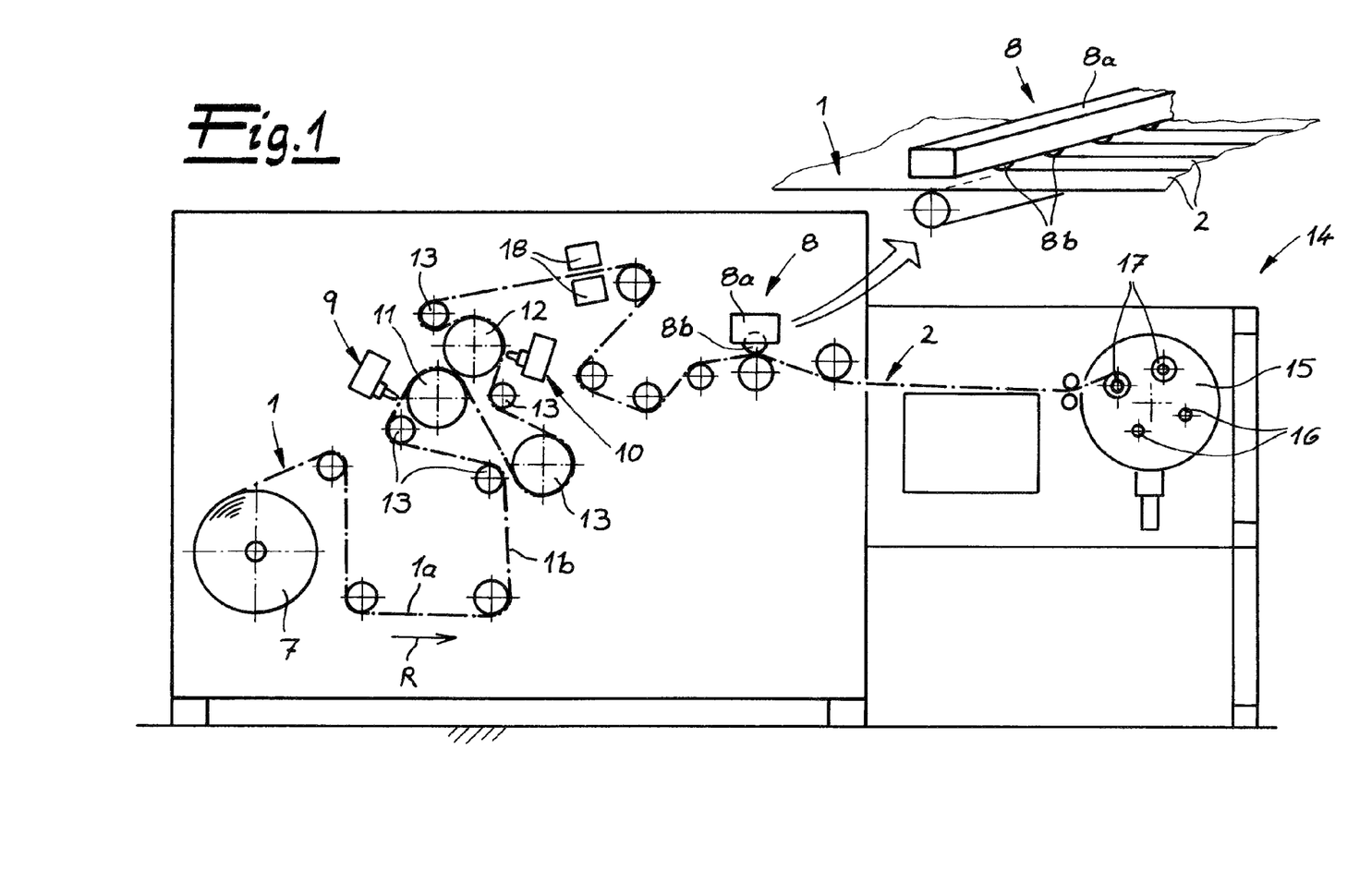
FIG. 1 is an overview of the apparatus according to the invention for making adhesive tape.

FIG. 1 shows an apparatus for of making a single or a plurality of adhesive tapes 2 from a substrate web 1. FIG. 2 and FIGS. 3 to 5 show basic structures of the adhesive tape 2.

Figure 2:
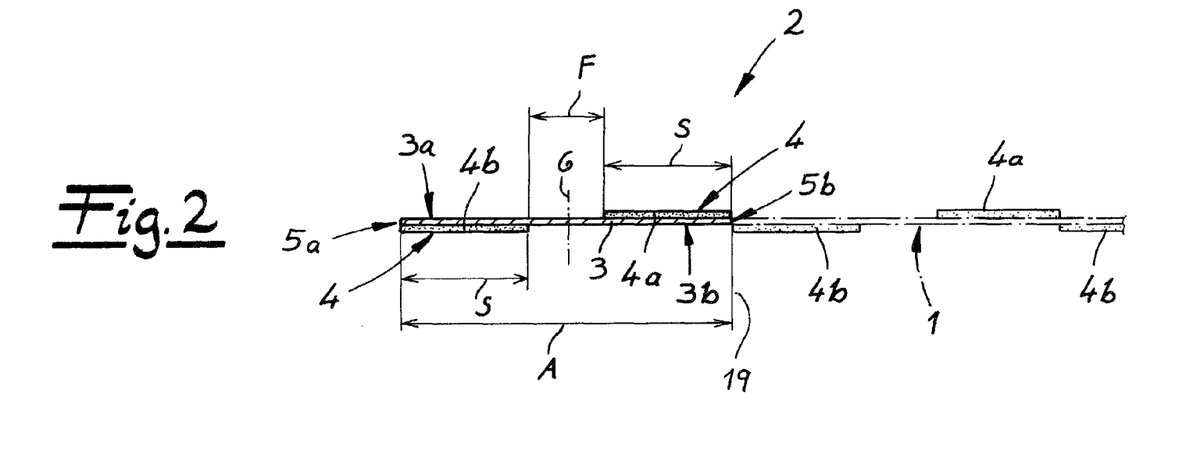
FIG. 2 is a schematic section through this adhesive tape.

In terms of the basic structure thereof, the adhesive tape 2 has a substrate 3 and at least one adhesive strip 4 that is applied to the substrate 3. In the embodiment of FIG. 2, the substrate 3 has an adhesive strip 4 on each face. The same is true, by comparison, with regard to the adhesive tapes 2 in FIGS. 3 to 5. In fact, an adhesive strip 4a is here shown on a substrate upper face 3a, as well as a further adhesive strip 4b on a substrate lower face 3b.

To distinguish between the two adhesive strips 4, the adhesive strip 4 on the substrate upper face 3a will be referred to below as adhesive strip 4a, while, in contrast, the adhesive strip 4 on the substrate lower face 3b will be identified by the reference 4b. The respective adhesive strips 4 and/or 4a, 4b cover, in the context of the present embodiment and without limitation, between about 5% and 50% of the total area of the respective substrate face 3a or 3b. In the embodiment shown in FIG. 2, the substrate 3 has, without being limited thereto, a total width A of about 20 mm. The adhesive strip 4a on the substrate upper face 3a can have a width S of about 8 mm. This way, an adhesive strip 4 is provided that covers, in the embodiment shown in FIG. 2, about 40% of the surface area of the respective substrate face and/or the substrate upper face 3a.

In the embodiment, two adhesive strips 4 and/or the adhesive strip 4a is/are provided on the substrate upper face 3a and the adhesive strip 4b on the substrate lower face 3b. The two adhesive strips 4a and 4b each have a width S of 8 mm in comparison to the total width A of 20 mm of the substrate 3. It is understood that this is intended as an example and not as a limitation to the scope of the present invention (see FIG. 2).

In addition, the adhesive strips 4 and/or 4a, 4b each extend longitudinally and at the edge of the substrate 3; meaning, each adhesive strip 4; 4a, 4b extends away from a respective substrate edge 5a or 5b of the substrate 3 toward a substrate center 6. The substrate center 6 also defines a tape longitudinal axis 6, due to the strip shape and/or rectangular section of the substrate 3. The tape longitudinal axis 6 represents the mirror symmetry axis overall of the adhesive tape 2 according to FIG. 2. It can be seen that the two adhesive strips 4a and 4b are at opposite substrate edges 5a and 5b of the substrate 3, as shown in FIG. 2.

In addition, the two adhesive strips 4a and 4b have a substantially identical width S that covers about 40% of the area of the respective substrate face 3a and 3b in this embodiment. The two adhesive strips 4a and 4b are made from the same adhesive compound. In fact, a hot-melt adhesive preferably derived from natural rubber has proved particularly beneficial in this context. In detail, this can be a synthesized natural rubber adhesive.

Between the two adhesive strips 4a and 4b there is, in the cross-section of the adhesive tape 2, a visible free area F of the substrate 3. This means that the two adhesive strips 4a and 4b do not overlap each other transversely. Rather, there is an offset. The free area F is symmetrical relative to the longitudinal axis 6 of the tape and configured itself as a free strip. The substrate 3 here can be any substrate 3 that is suitable for carrying the adhesive compound. In actuality, possibly, a textile substrate made of a polyester fabric can be used in the embodiment. This substrate can typically have a tape thickness of perhaps about 0.2 mm.

The apparatus shown schematically in FIG. 1 is used in the actual production of the adhesive tape 2 and/or the adhesive tapes 2 shown in FIGS. 3 to 5 and FIG. 6. The apparatus has first a supply 7 for the previously mentioned substrate web 1. The supply 7 is simply a wound-up roll storing material; here, the substrate web 1, which is a polyester fabric, is wound up in this roll. The substrate web 1 has and can have a width that is a multiple of the total width A of the adhesive tape 2. In practice, the substrate web 1 can, for example, have a width ranging from 3 A to 20 A, wherein A is the width of the adhesive tape 2. Correspondingly, a cutting device 8 provided at the downstream end of the apparatus ensures that the substrate web 1 is divided and can be divided into the described number of adhesive tapes 2.

To this end, in the present embodiment, the cutting device 8 is configured as a blade beam 8a that carries several rotating blades 8b along its length. One adhesive tape 2 each is defined between adjacent rotating blades 8b. The cutting device 8 or blade beam 8a extends transversely to the longitudinal extension of the substrate web 1. This can be seen in the perspective view of FIG. 1.

Aside from the supply 7 and the previously mentioned cutting device 8, the basic design according to FIG. 1 includes also at least one coating device and/or nozzle 9, 10 that applies one or more adhesive strips 4; 4a, 4b to the substrate 3 or the substrate web 1. In this there are two nozzles and/or coating devices 9, 10 mounted opposite each other and applying the material to different faces of the substrate web 1.

In fact, using the nozzle 9, a substrate upper face 1a is provided with a single or a plurality of adhesive strips 4; 4a; while, in contrast, a nozzle 10 serves for coating the opposite substrate web lower face 1b. The substrate web upper face 1a of the substrate web 1 defines, after it has gone through the cutting device 8, the substrate upper face 3a of the substrate 3 and/or of the then produced adhesive tape 2. The substrate web lower face 1b of the substrate web 1, on the other hand, is part of the substrate lower face 3b of the substrate 3 and/or of the adhesive tape 2 downstream of the cutting device 8.

The nozzles 9 and 10 extend transversely to the longitudinally traveling the substrate web 1. In addition, the each nozzle 9 or 10 has a respective guide roller 11 or 12. With the assistance by these two guide rollers 11 and 12 and further guide rollers 13, that the substrate web 1 is surely guided substantially vertically or almost vertically past the nozzles 9 and 10. This way, it is possible to create the individual adhesive strips 4; 4a, 4b with ease on the substrate web 1. Starting from the supply 7, the substrate web 1 is actually advanced in the feed and/or transport direction R via the guide rollers 13 and/or 11, 12. The substrate web 1 thus travels past the nozzle 9 and 10 substantially vertically such that the adhesive that is discharged by the nozzles 9 and 10 forms the one or more adhesive strips 4; 4a, 4b on the substrate web 1 downstream of the nozzles 9 and 10.

The two nozzles 9 and 10 are at a preset spacing one after the other in the transport direction R of the substrate web 1. The spacing between the two nozzles 9 and 10 is such that the adhesive strip 4; 4a, 4b is configured to adhere completely to the substrate web 1. The adhesive and/or the adhesive strip 4; 4a, 4b can be cold or cured, for example (by cross-linking) prior to coming into contact with a guide roller 11, 12, 13 downstream.

As explained previously, the nozzle 9 is effective on the upper face of the substrate web 1a and ensures that a plurality of adhesive strips 4a is defined on the substrate web 1. Between the individual adhesive strips 4a of the respective strip width S, there is a spacing of F+S as shown in FIG. 2. This is followed by a further second adhesive strip 4a of the adjacent further adhesive tape 2 that is to be separated in the cutting device 8. This further adhesive tape 2 is indicated in FIG. 2 by a dot-dash line and separated from the adhesive tape 2, which is indicated by a solid line, by a cut edge 19.

The substrate web 1 is guided substantially vertically or almost vertically past the nozzles 9 and 10 that extend transversely thereto. It must be ensured that the substrate web 1 does not shift at all or does not shift substantially relative to the nozzles 9 and 10. As a matter of principle, the nozzles 9 and 10 can also be arranged differently relative to the substrate web 1. The important aspect therein is that no "bleeding" of adhesive occurs between the application of the adhesive strips 4; 4a, 4b and the cutting step of the mentioned adhesive strips 4; 4a, 4b downstream. This is absolutely necessary for making an exact cut along the adhesive edge; meaning, applied to the upper face of the substrate web 1a and/or the substrate upper face 3a, the spacing between the created adhesive strips 4a along the total substrate web 1 is F+S, respectively. This ensures that, after traversing the cutting device 8, the edge of adhesive strip 4a is exactly aligned with the edge 5b of the substrate 3. The same is true for the adhesive strips 4b of the lower face of the substrate 3b.

The nozzles 9 and 10 each extend transversely along the full width of the substrate web 1. Moreover, each nozzle 9 and 10 is provided with a respective template at its outlet. This template determines the exact width and/or position of the adhesive strips 4a and 4b, created on the respective substrate 3. This means that the template determine, with regard to the upper face of the substrate 1a and/or the lower face of the substrate 3a, the exact positions of the adhesive strips 4a that extend with a spacing between them relative to each other.

At the downstream end of the apparatus as shown in FIG. 1 there is a so-called turret winder 14. The turret winder 14 has a support disk 15 that carries individual shafts 16 for forming the adhesive-tape rolls 17. After the production of the adhesive tapes 2 downstream of the cutting device 8, the individual adhesive tapes 2 are wound up on the respective adhesive-tape rolls 17.

When the adhesive-tape rolls 17 are full, the turret winder 15 is rotated so that other adhesive-tape rolls 17, which were until this time on the opposite side of the support disk 15 and still empty, can now function for winding up the adhesive tapes 2.

With the aid of the turret winder 14, it is possible to produce rolls of adhesive tape 2 and/or the adhesive tapes 2 that are overall wound up in opposite or synchronous directions. It is understood that, naturally, it is possible to have a plurality of turret winders 14, with support disks 15 with different directions of rotation. This way, it is possible, for example, starting from a substrate web according to FIG. 4, to make left-wound and right-wound versions of the adhesive tape 2; meaning, tapes that are wound in opposite as well as the same directions.

Finally, the apparatus according to FIG. 1 also has one and/or two cross-linking devices 18 upstream of the cutting device 8 and in the transport direction R downstream of the two nozzles 9 and 10. The cross-linking devices 18 cross-link, on the one hand, the adhesive strips 4a on the upper face of the substrate web 1a and/or the upper face of the substrate 3a and, on the other hand, the adhesive strips 4b on the lower face of the substrate web 1b and/or the lower face of the substrate 3b, if necessary. For this purpose, the cross-linking devices 18 can be UV lamps as shown. The lamps are typically provided directly downstream of the nozzles 9 and 10 to prevent any contact with the guide rollers 12, 13 and/or 11, 13 by non-cross-linked adhesive. The guide rollers 12, 13 and/or 11, 13 in question are, as is usual, generally designed as adhesive-proof. Moreover, the cross-linking device 18 can also be at a remote location outside of the actual apparatus. In this case, the UV light can be brought to the desired location by an optical conductor, for example. In the illustrated embodiment, the two cross-linking devices 18 are opposite each other, so the substrate tape 1 is guided between the two cross-linking devices 18.

Figure 3:
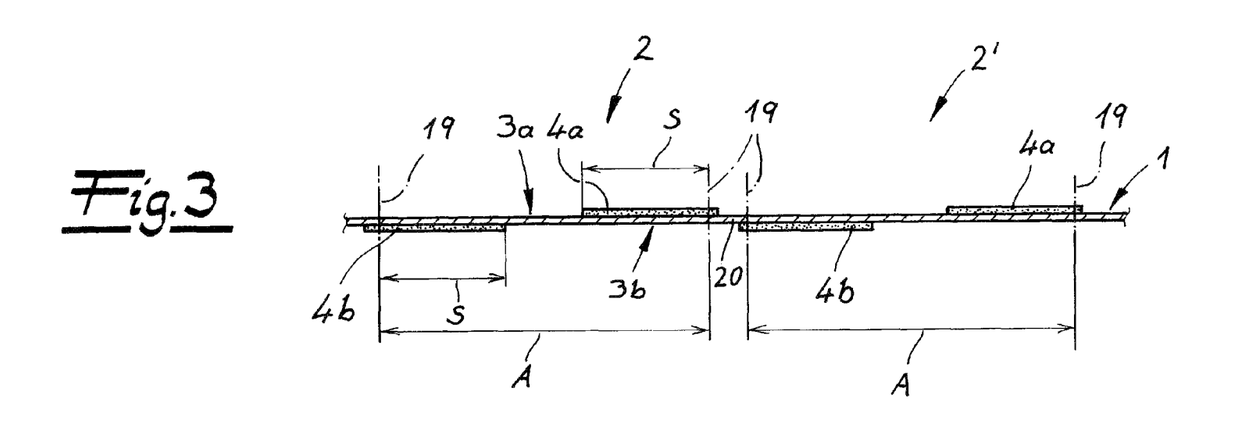
FIGS. 3 to 6 show of different process steps when cutting the substrate web for making the adhesive tape.
Figure 4:
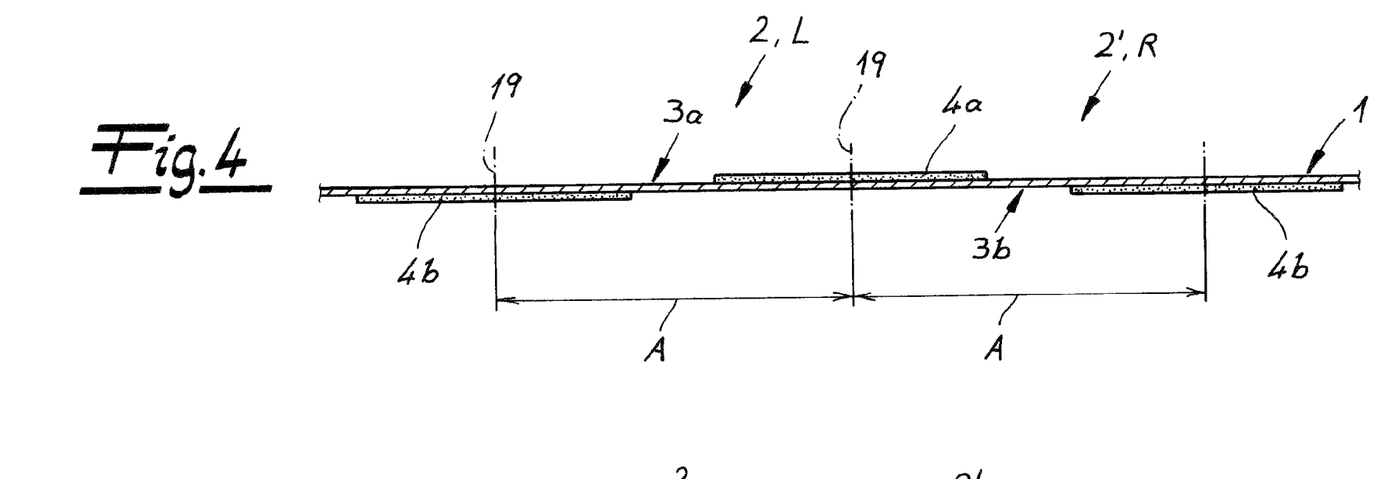
Figure 5:
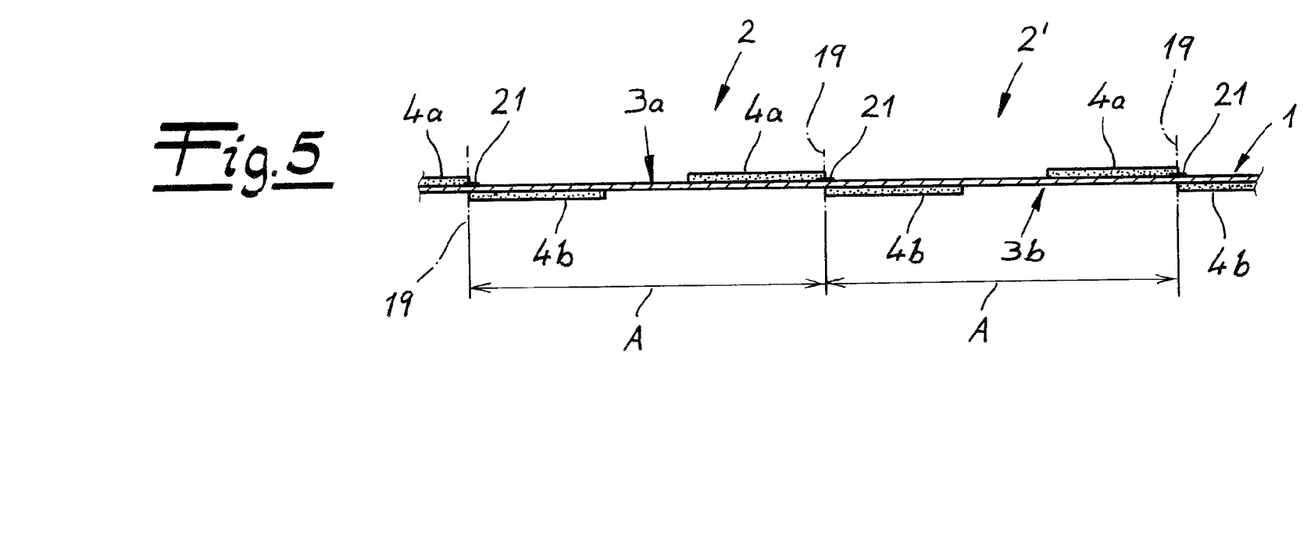

Other possibilities for making the adhesive tape 2 are shown in FIGS. 3 to 5. Accordingly, a variant can be seen in FIG. 3 where the coated substrate web 3 is not cut exactly true to the edge, as shown in FIG. 2. Rather, the coated substrate web 1 is cut at the respective adhesive strip 4; 4a, 4b. FIG. 3 thus shows that a respective cut edge 19 is defined on the edge of each of adhesive strips 4a and 4b, yet still in the adhesive strip 4a and 4b. This creates an excess and/or waste region 20 between two adjacent adhesive strips 4a and 4b. The excess and/or waste region 20 can be intentionally planned to allow for the possibility of compensating for any imprecisions that occurred during the production of the adhesive strips 4; 4a, 4b at their edges. Furthermore, it is understood that, naturally, the waste region 20 can also be used for making a "normal" adhesive-tape roll and/or a proper adhesive tape 2. This roll can then be separated from the other adhesive tapes 2. Nevertheless, after the cutting step, adhesive tapes 2 of the desired width A are available in this scenario as well.

In the variant according to FIG. 4, the coated substrate web 1 is also cut in the one of the strips 4; 4a, 4b. Actually, it can be seen that the cut edge 19 is in the center of the adhesive strip 4; 4a, 4b. This way, it is possible to produce adjacent adhesive tapes 2 and 2'. The adhesive tape 2 and the adhesive tape 2' are wound in opposite directions onto a roll that is not shown here. This is indicated by "L" for a left winding and "R" for a right winding in FIG. 4. It is understood that, in the same manner, it is naturally possible, following the same principle, to produce only adhesive tapes 2 and 2' for a left or only those for a right winding direction.

FIG. 5 shows a further variant of the cutting process. Here, a nonstick coating 21 was applied first to the substrate area and/or substrate web 1 of the cut edge 19. The adhesive strip 4a and 4b is not applied until afterward. This way, an especially clean cut and, in particular, the absence of any "fraying" of the substrate web 3 is noted at the cut edge 19.

In fact, the substrate 3 is typically a fabric substrate 5, such that at the cut edge 19 (that is not coated with adhesive) there exists the risk that threads of the substrate web 1 can protrude or are torn or pulled out during cutting. This is not the case when the additional and in most instances nonstick coating 21 is used in the cut area and/or at the cut edge 19. In actuality, the nonstick coating 21 in question is applied to the substrate web 1 at the cut edge 19 prior to the application of the actual adhesive strips 4; 4a, 4b that are applied with the aid of the coating device and/or the nozzles 9 and 10.

For this purpose it is conceivable to position a third nozzle upstream of the two nozzles 9 and 10 that will ensure that the nonstick coating 21 is sprayed onto the substrate web 1. In the embodiment of FIG. 5, the nonstick coating 21 is only on the upper face of the substrate 3a, because the knife blades of the blade beam 8 that is used at this location plunge into the substrate web 1 at this point. As a matter of principle, the coating 21 in question can naturally also only be provided on the lower face of the substrate 3b, or on the upper face of the substrate 3a and the lower face of the substrate 3b. This will depend on the cutting process downstream and/or the configuration of the cutting device 8.

Figure 6:
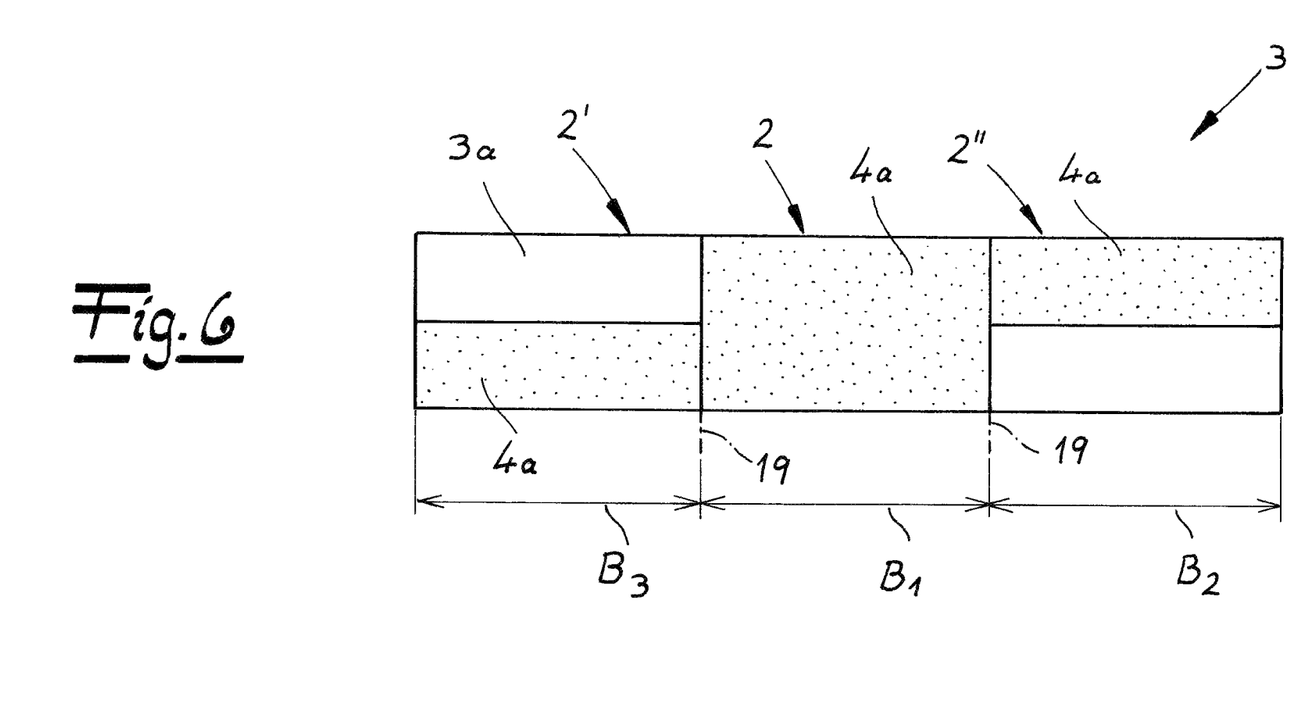

Finally, FIG. 6 shows a substrate web 1 that is provided with different longitudinally extending adhesive strips 4; 4a, 4b, especially, as seen in the embodiment, on the upper face 3a of the substrate. As a matter of principle, a comparable design is also conceivable on the lower face of the substrate 3b, as well as on both substrate faces 3a and 3b. It can be seen that the substrate web 1 is coated along its full longitudinal length at least in an area $B_1$ with full surface coverage. A further second area $B_2$ and/or $B_3$ is provided with partial surface coverage. This means that here the respective adhesive strip 4a, as shown in this embodiment, covers only a part of the substrate web 1.

The individual areas $B_1$, $B_2$ and $B_3$ of the substrate web 1 extend longitudinally along respective adhesive edges 2, 2' and these adhesive edges 2, 2' and 2" are subdivided from each other, by the cut edges 19 that seen relative to the substrate web 1 extend transversely. This means that the substrate web 1 is cut a transversely for the production of the individual adhesive tapes 2, 2' and 2".

The invention claimed is:

1. A method of making adhesive tapes, the method comprising the steps of:
    feeding a substrate web having two opposite faces from a supply to two coating devices;
    applying with the coating devices to each of the faces an adhesive coating to form on each face at least one longitudinally extending adhesive strip with the strips transversely offset from each other and each face having at least one longitudinally extending adhesive-free strip; and
    cutting the substrate web longitudinally between the adhesive strips into individual adhesive tapes each having a respective one of the strips.

2. The method according to claim 1, wherein the substrate web is guided substantially vertically or almost vertically at the coating devices.

3. The method according to claim 1, wherein the coating devices and the substrate web are moved relative to each other.

4. The method according to claim 1, wherein each coating device is a nozzle, spray device, or pour-on device.

5. The method according to claim 1, wherein the adhesive is applied in a contactless fashion to the substrate web.

6. The method according to claim 1, wherein the coated substrate web is cut such that opposite or synchronous coils of the adhesive tape are created.

7. The method according to claim 1, wherein the coated substrate web is cut exactly true to edge.

8. The method according to claim 1, further comprising the step of:
    applying a nonstick coating at the cut edge prior to application of the adhesive strip.

9. The method according to claim 1, further comprising the steps of:
    winding the tape and then cutting the wound tape to obtain individual adhesive-tape rolls.

10. The method according to claim 1, wherein a plurality of the adhesive strips separated by adhesive free zones are formed on each of the faces of the web, with each adhesive strip of the one face offset transversely from or between the adhesive strips of the other face.

11. A method of making adhesive tape, the method comprising the following method steps:
    feeding a substrate web having upper and lower faces from a supply to a plurality of coating devices;
    applying adhesive with the coating devices to at least one of the faces the substrate web to form thereon a plurality of longitudinally extending adhesive strips such that in at least one longitudinally extending area of the strip the one face is coated with full coverage and in at least one further area the one face is coated with only partial coverage; and
    cutting the substrate web longitudinally into individual adhesive tapes, the individual areas corresponding to different adhesive tapes along the longitudinal extension of the substrate web.

* * * * *